United States Patent [19]

Roth et al.

[11] 4,274,792
[45] Jun. 23, 1981

[54] APPARATUS FOR THE AUTOMATIC UNFASTENING OF GLASS SHEETS SUSPENDED FROM PINCER-LIKE GRIPPING MACHINES

[75] Inventors: Mario Roth, Aachen; Werner Pagel, Herzogenrath; Heinz-Bernd Rissmann; Karl-Christoph Happich, both of Aachen, all of Fed. Rep. of Germany

[73] Assignee: Saint Gobain Industries, Neuilly-sur-Seine, France

[21] Appl. No.: 41,898

[22] Filed: May 23, 1979

[30] Foreign Application Priority Data

Jul. 6, 1978 [FR] France .............................. 78 17026

[51] Int. Cl.³ .............................................. B65G 67/04
[52] U.S. Cl. .................................. 414/564; 414/392; 414/567; 198/486; 198/680
[58] Field of Search ............... 198/484, 486, 650, 680; 414/373, 390-392, 564, 567

[56] References Cited

U.S. PATENT DOCUMENTS

| 2,103,850 | 12/1937 | Hinsey | 198/650 |
| 3,066,785 | 12/1962 | Rosendahl | 198/484 |
| 3,178,045 | 4/1965 | Davidson, Jr. et al. | 198/650 |
| 3,412,841 | 11/1968 | Couch et al. | |
| 3,530,970 | 9/1970 | Richardson et al. | |
| 3,610,393 | 10/1971 | Richardson et al. | |
| 3,869,053 | 3/1975 | Gilbank | 414/373 |
| 4,006,002 | 2/1977 | Hetman, Jr. | |

FOREIGN PATENT DOCUMENTS

| 693448 | 1/1967 | Belgium . |
| 417785 | 8/1925 | Fed. Rep. of Germany . |
| 1258473 | 7/1961 | France . |
| 1341678 | 1/1964 | France . |
| 52-59615 | 12/1975 | Japan . |
| 501984 | 7/1973 | U.S.S.R. . |

Primary Examiner—Robert W. Saifer
Attorney, Agent, or Firm—Pennie & Edmonds

[57] ABSTRACT

An apparatus for automatically unfastening sheets of glass which are suspended vertically from pincer-like gripping means including a lifting element for lifting a sheet of glass towards the gripping means. A release means for moving the gripping means out of engagement with the sheet is included when a sheet is raised by the lifting means. The lifting means includes at least one gripper element which is movable in a horizontal direction to grip a surface of a sheet of glass.

18 Claims, 7 Drawing Figures

APPARATUS FOR THE AUTOMATIC UNFASTENING OF GLASS SHEETS SUSPENDED FROM PINCER-LIKE GRIPPING MACHINES

TECHNICAL FIELD

The invention relates to an apparatus for automatic unfastening of sheets of glass from pincer-like gripping means where the gripping means automatically grips the sheet under the influence of the weight of the sheet and which includes a lifting means by which a sheet of glass may be raised against the pincer-like gripping means to effectuate release therefrom.

BACKGROUND ART

Automatic means for unfastening a sheet of glass from pincer-like gripping means or tongs from which the sheet is suspended and where the pincer-like gripping arrangement is effectuated by the weight of the sheet of glass have been proposed previously and examples of such are disclosed in German Pat. No. 1,255,875 and U.S. Pat. No. 2,530,970. The apparatus as described in these patents however includes lifting arrangements for raising a suspended sheet of glass towards pincer-like gripping elements or tongs by engaging the glass sheet at its lower edge. Such apparatus is therefore suitable only with a glass sheet where the lower edge runs substantially in a horizontal direction and is not susceptible for use with a curved sheet of glass having a complex shape, as for example, exists in some forms of automobile windows.

It is therefore an object of our invention to provide for an apparatus which may automatically unfasten a sheet of glass which is suspended from pincer-like gripping means or tongs and which will be applicable with and which will engage the sheet along areas of the sheet other than the lower edge.

DISCLOSURE OF INVENTION

Broadly our invention contemplates an apparatus for automatically unfastening sheets of glass which are suspended vertically from pincer-like gripping means and where the weight of the sheet causes the gripping means to automatically grip the sheet. A lifting means is provided for lifting the sheet towards the pincer-like gripping means to unfasten the sheet from the gripping means and a release means is included for moving the pincer-like gripping means out of engagement with the sheet. The lifting means includes a gripper element which is movable in a horizontal direction towards the sheet to grip the same along its side surface so that it no longer becomes necessary to engage the sheet along its bottom edge in order to raise it towards the pincer-like gripping means. As a result, glass sheets may be unfastened automatically from pincer-like gripping arrangements which heretofore could only be unfastened manually, as for example sheets forming the side windows of automobiles where each sheet has an edge tapering to a point on one side and where the sheet is suspended from the pincer-like gripping means with the point extending downwardly. The gripper element mounted on the lifting means grasps or grips one or both side surfaces of a glass sheet such that it is capable of unfastening glass sheets of any arbitrary circumferential shape and even sheets that are curved.

In one form of the invention the gripper element may comprise a suction plate which may contact one side of the glass sheet and wherein the lifting means has in addition a supporting means which contacts the other side of the glass sheet from the suction plate.

In another form of the invention, the lifting means has two gripper elements where each gripper element comprises a movable jaw between which a sheet of glass is disposed. The gripper jaws may form part of pneumatic pistons so that they may engage a sheet of glass under pneumatic pressure. The gripper jaws in addition may be mounted on pivotal or rotatable arms which arms in turn are mounted on a support where the support is rotatable about a horizontal axis so that the gripper arms and the sheet between the arms may be rotated about the horizontal axis to move the sheet from a perpendicular position to a generally horizontal position where it may be deposited onto a conveyor. In the alternative the gripper jaws may be mounted so as to be moved up and down vertically whereby sheets of glass may be released from the pincer-like gripping means and lowered into fork-shaped holders carried by a horizontal moving conveyor while the sheets remain in a substantially perpendicular position.

BEST MODES FOR CARRYING OUT THE INVENTION

Figure 1:
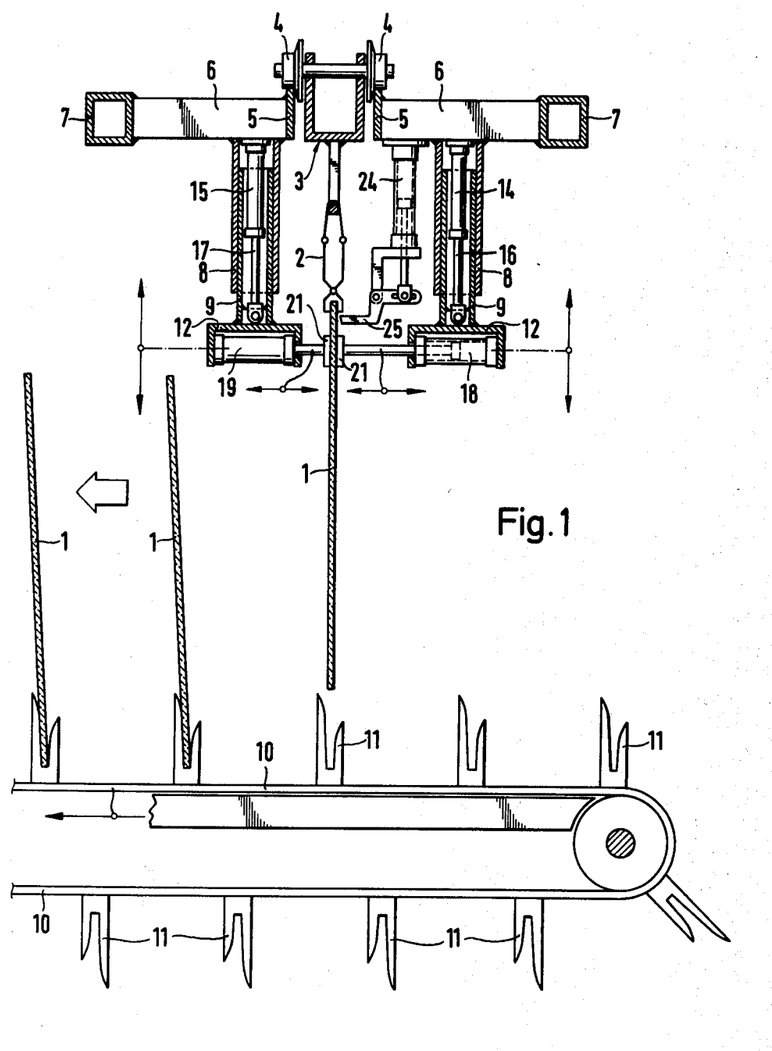
FIG. 1 is a side sectional view of an apparatus constructed according to the invention.

Referring to FIG. 1 there is illustrated a sheet of glass 1 which is suspended from pincer-like gripping means or tongs 2 connected to a transfer truck 3. Transfer truck 3 is mounted by wheels 4 to run on rails 5 whereby sheets of glass may be transferred through a tempering furnace and through various processing stations. Rails 5 in turn are mounted on carriers 6 connected to the main frame 7 of the apparatus.

The glass sheets 1 are unfastened from the gripping means 2 after heat treatment and are placed in forked-shaped holders 11 mounted on a horizontal extending conveyor belt 10 in order that the sheets may be moved to a further processing station. The conveyor 10 also serves as a means for cooling the glass sheets which are still hot as a result of processing steps. The carriers 6 each mount telescoping square guide sections 8 and 9 with the sections 9 being movable vertically within the sections 8 by means of double-acting pneumatic cylinders 14 and 15 which have pistons slidable therein connected to piston rods 16 and 17. Piston rods 16 and 17 in turn are connected to supports 12 which have pneumatic pressure cylinders 18 and 19 contained therein. Cylinders 18 and 19 each have a piston rod therein slidable in a horizontal direction and which include a gripper element comprising a jaw 21 connected at their ends.

When gripper jaws 21 engage a sheet, the cylinders 14 and 15 are actuated to lift the sheet to release or unfasten the pincers 2 which normally grip the sheet under the force of its weight. After the sheet 1 has been raised, a release means in the form of cylinder 24 is actuated to move a toggle lever 25 to move the pincer-like gripping means 2 out of engagement with the sheet 1. Cylinders 14 and 15 are then actuated to lower the sheet into the forked-shaped holder 11. The pneumatic cylinders 18 and 19 are then actuated to move the jaws 21 in a horizontal direction away from the sheet. The cylinders 14 and 15 are then actuated to raise the gripping jaws back toward the starting position where they will again be in a position to renew the unfastening cycle after the arrival of the next sheet of glass into the unfastening station.

The gripper elements or jaws 21 may take the form of a suction plate made from an elastic material which will resist the high temperatures of the glass sheet. Examples of such material are silicon rubber, polytetrafluoroethylene or other fluoroelastomers. Where only one of the gripper elements 21 takes the form of the suction plate, then the opposing element must take the form of a support in order that the gripper element in the form of the suction plate may be brought into tight sealing engagement with the sheet.

Referring to FIGS. 2-6 a further embodiment of the invention is illustrated which is particularly adaptable for the simultaneous unfastening of a plurality of glass sheets from pincer-like gripping means. As shown, glass sheets 1, 1' and 1" are each suspended from pincer-like gripping means 2 mounted on a transfer truck 3 in turn mounted by wheels 4 to move along tracks 5 extending from a furnace or tempering station 28 to the unfastening station. This multiple suspension of sheets from a transfer truck is particularly adaptable where small glass sheets are being treated as it results in better utilization of the capacity of the installation since three glass sheets may be tempered simultaneously in the tempering station 28.

Figure 4:
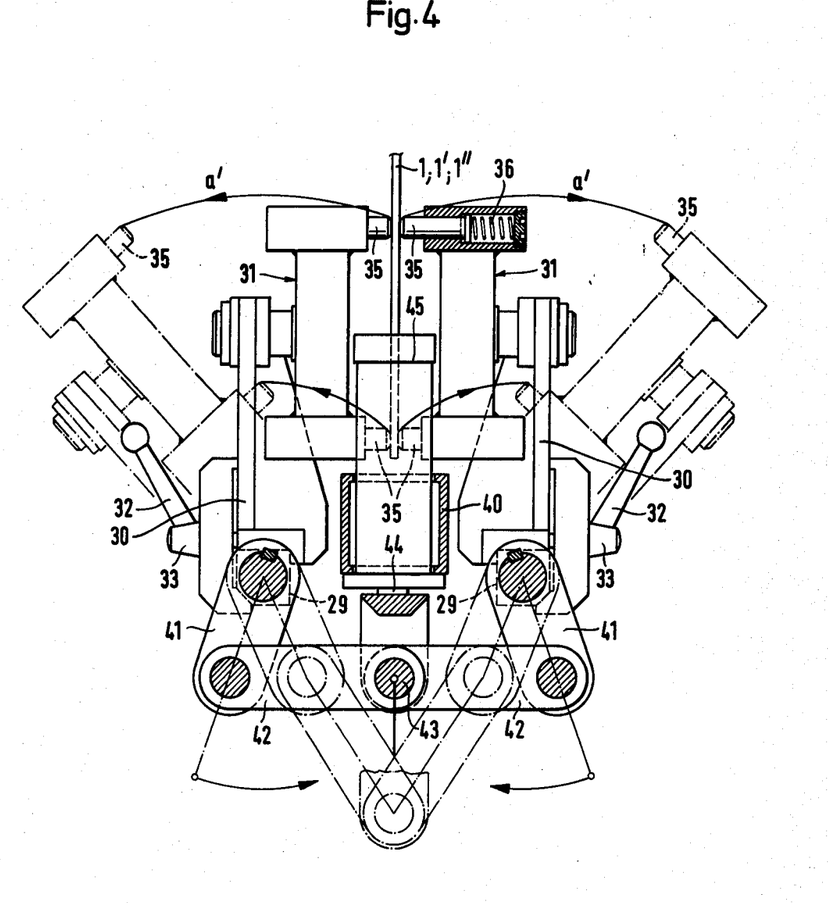
FIG. 4 is an enlarged sectional view of the end of a portion of the apparatus illustrated in FIG. 2.
Figure 5:
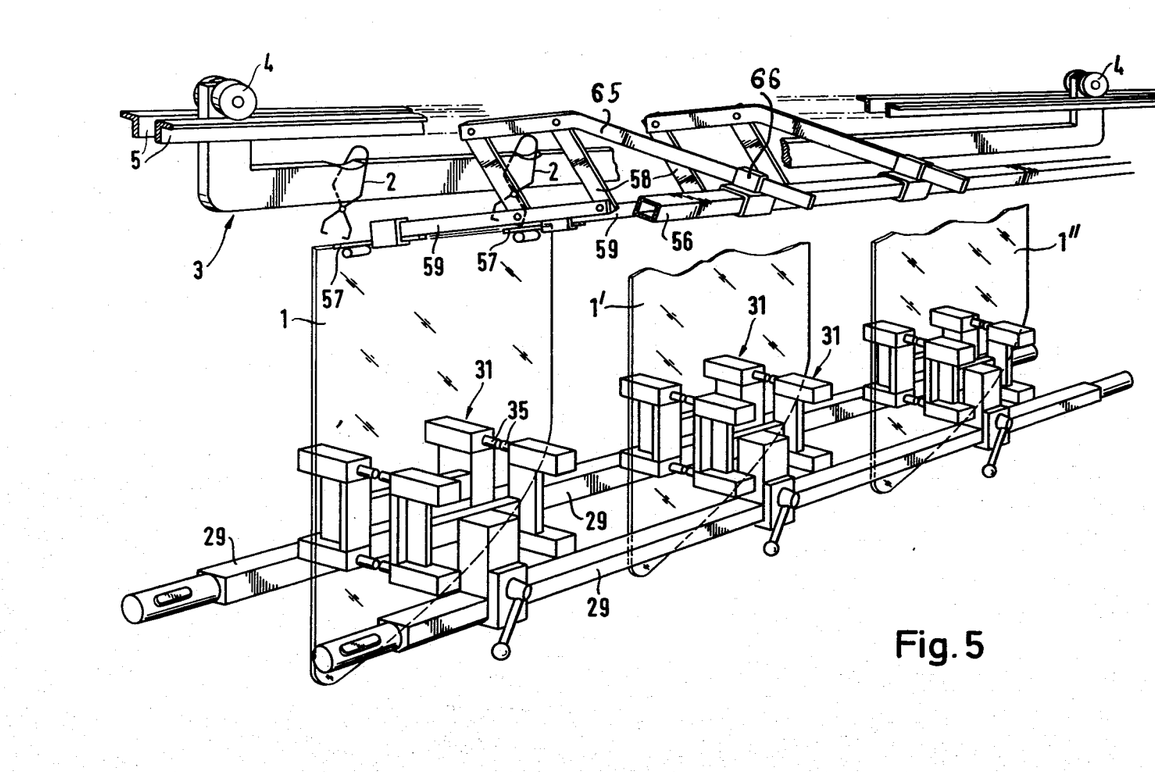
FIG. 5 is a perspective view of a portion of the apparatus of FIG. 2 illustrating sheets of glass immediately after they have been unfastened from pincer-like gripping means.

Square shafts 29 are positioned below the lower edge of the sheets being released along both sides of the plane of movement of the sheets through the device. The shafts 29 are rotatable about their longitudinal axis and are disposed opposite one another with each shaft including supporting arms 30 which in turn mount gripping jaws 31. The gripping jaws 31 are movable longitudinally along the square shafts 29 in order to be positioned opposite each sheet of glass and to accommodate sheets of different sizes. The jaws 31 are locked into place on a shaft by screws 33 which are tightened by handles 32. Each gripping jaw 31 has four supporting pegs 35 adapted to come into contact with a glass sheet. These pegs comprise a material which will not damage the surface of a glass sheet, as for example, polytetrafluoroethylene. At least one of two oppositely disposed holding pegs 35 is mounted resiliently with respect to its gripping jaw, as for example by way of a compression spring 36 as shown in FIG. 4, in order to limit the compressive forces transferred to the sheet.

Figure 2:
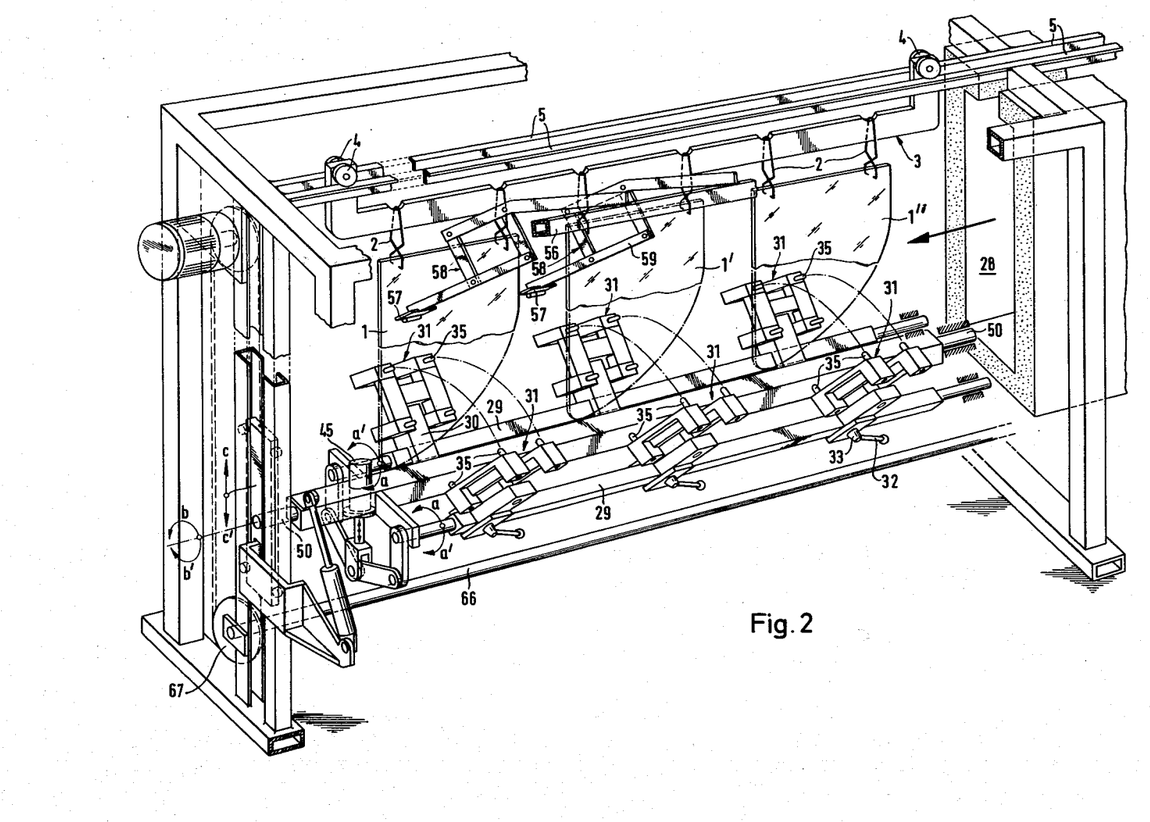
FIG. 2 is a perspective view of a different embodiment of an apparatus constructed according to the invention.
Figure 3:
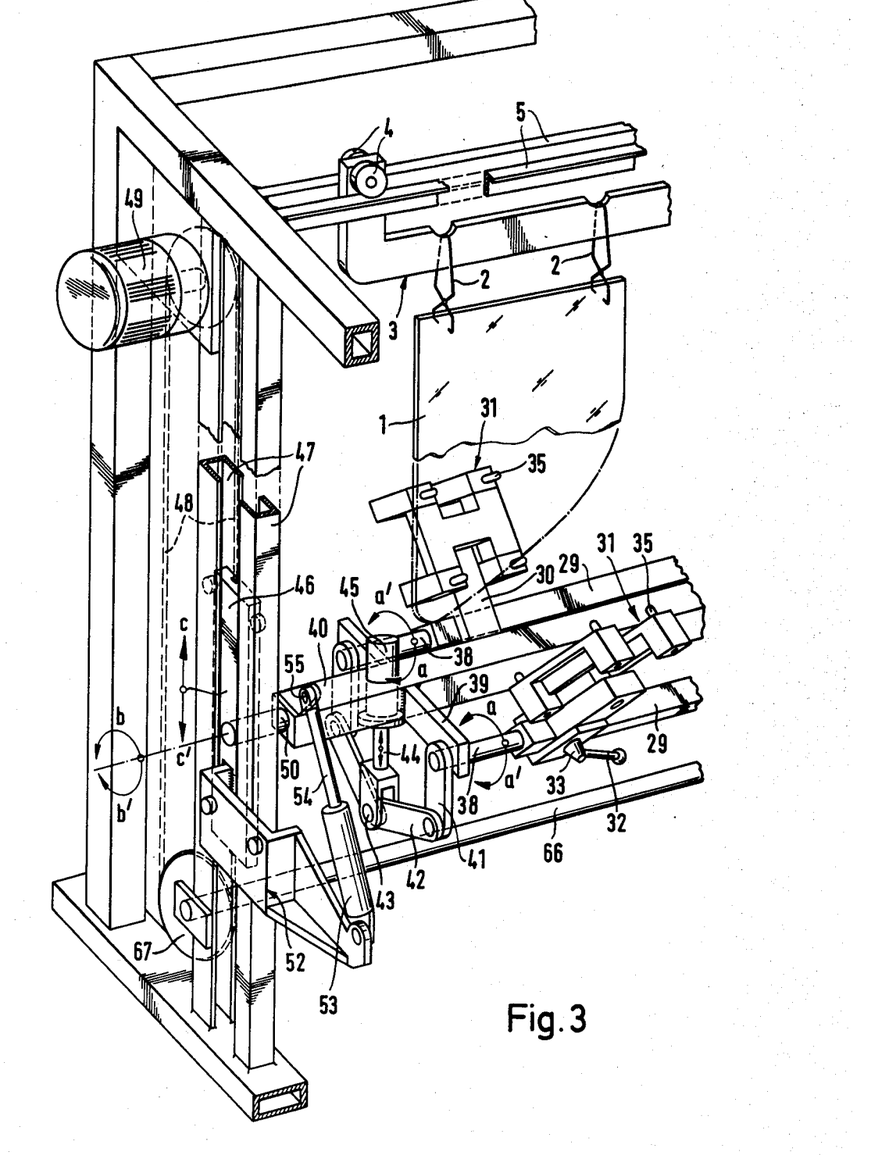
FIG. 3 is an enlarged portion of FIG. 2.

The two square shafts 29 each have bearing pins 38 on their ends rotatably mounted in brackets 39 so that the shafts may rotate in the direction of the arrows a-a' as shown in FIGS. 2 and 3. The brackets 39 in turn are attached to a spar 40 which is rotatable about its central axis by way of a bearing pin 50. A lever 41 is connected to each bearing pin 38 of the square shafts 29 whereby the shafts 29 may be rotated. Each lever 41 in turn is connected to a lever 42 which is connected to a piston rod 44 by means of a pivotal joint 43 and where piston rod 44 is slidable in a pressure cylinder 45. The elements 41-45 thus provide for the rotational movement of each square shaft 29 and act in the manner of a toggle lever drive which is particularly desirable for movement of the gripping jaws 31.

The bearing pin 50 at the left end of the spar 40 carrying the entire gripping mechanism is mounted in a carriage 46 which is movable vertically along two vertical rails 47. The drive in the vertical direction, i.e. in the direction of the arrows c-c' of FIG. 3, occurs by way of a chain drive 48 which is driven by an electric motor 49. At the opposite end of the device, the spar 40 is also mounted in a bearing pin 50 in turn carried by a vertical movable carriage, not shown, which is also moved by the motor 49. To accomplish this, a shaft 66 extends the length of the device and is connected at one end to a sprocket wheel 67 driven by chain drive 48. The other end of the shaft 66 is connected to a similar sprocket wheel, chain drive and vertical movable carriage, all not shown, at the opposite end of the device.

As shown in FIG. 3, a bearing block 52 is mounted on the end of the carriage 46 and has a double-acting pressure cylinder 53 mounted thereon. The piston rod 54 of the cylinder 53 is attached to the spar 40 by way of a bearing 55. By this arrangement the entire vertical shiftable gripping arrangement may be rotated about the horizontal longitudional axis 50 of the spar in order to deposit glass sheets in the direction of arrows b-b' at a position 90° with respect to the movement of the sheet from the tempering station. This movement or tilting of the glass sheet is disclosed in FIG. 6.

When a transfer truck 3 with suspended glass sheets moves into the unfastening station, pressure cylinder 45 is activated whereby the gripping jaws 31 are rotated in opposite directions towards each other so that each pair of cooperating gripping jaws clamps a glass sheet between them. Activation of the motor 49 then raises the glass sheets a few centimeters to remove the force of gravity tending to fasten the sheet in the gripping means 2. As shown by reference to FIG. 5, the square shaft 56 is then rotated about an angle of approximately 45° by a drive, not shown. This causes wipers or release means 57 which are mounted on one end of a coupling parallelogram frame 58 by way of suspension arm 59 to come into contact with the glass sheet, slide over the sheet in an upwardly direction and scrape the gripping pincers 2 which have been relieved from load over the top edge of the sheet.

Figure 6:
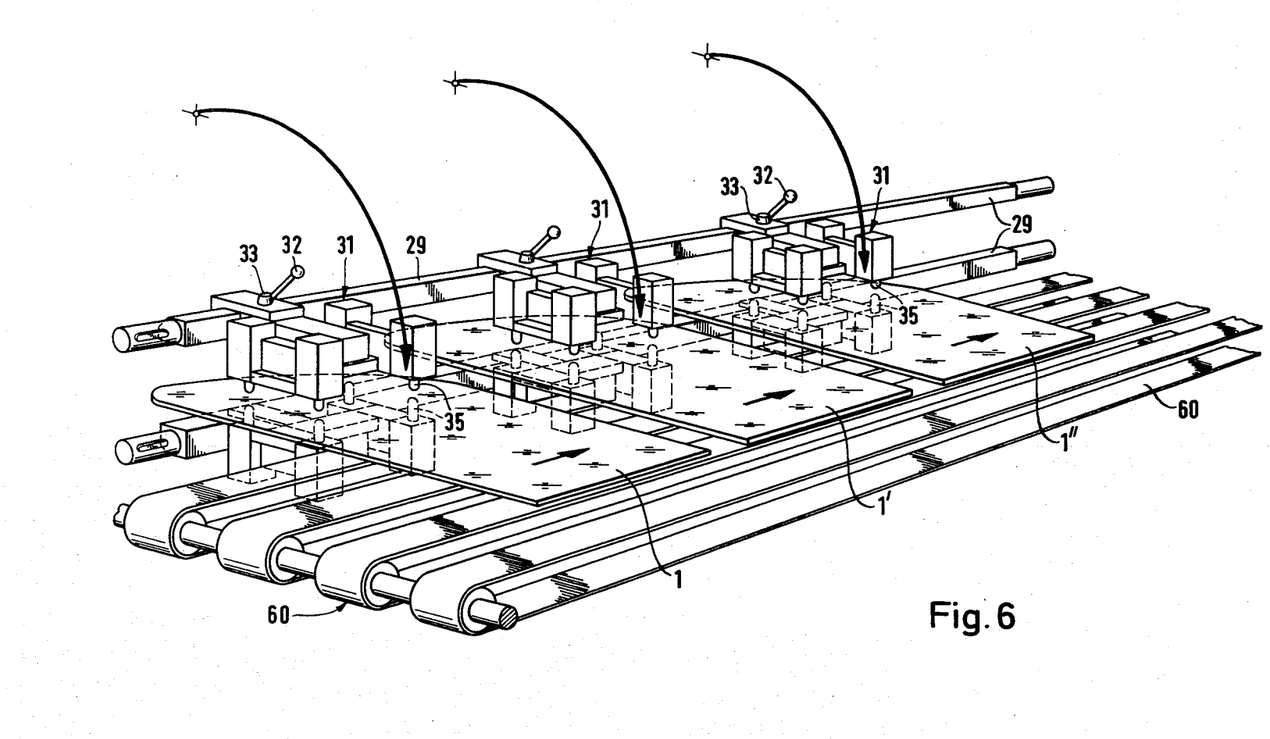
FIG. 6 is a perspective view of a portion of FIG. 2 illustrating tilting of a sheet of glass onto a horizontal extending conveyor belt.

The coupling parallelogram frame 58, 59, 65 insures that the scrapers or release means 57 are moved against the surface of the sheet with a small force. This force is determined by suspending arms 58 and 59 such that the weight of these arms determines the force at which the release means engages the sheet. By tilting the entire gripping mechanism around the horizontal axis 50 upon actuation of the pressure cylinder 53, the three glass sheets as shown in FIG. 2 are moved simultaneously into a horizontal position where they may be simultaneously deposited upon a horizontal conveyor belt 60 as shown in FIG. 6. The glass sheets 1, 1' and 1" then lie side-by-side on the conveyor belt 60.

Figure 7:
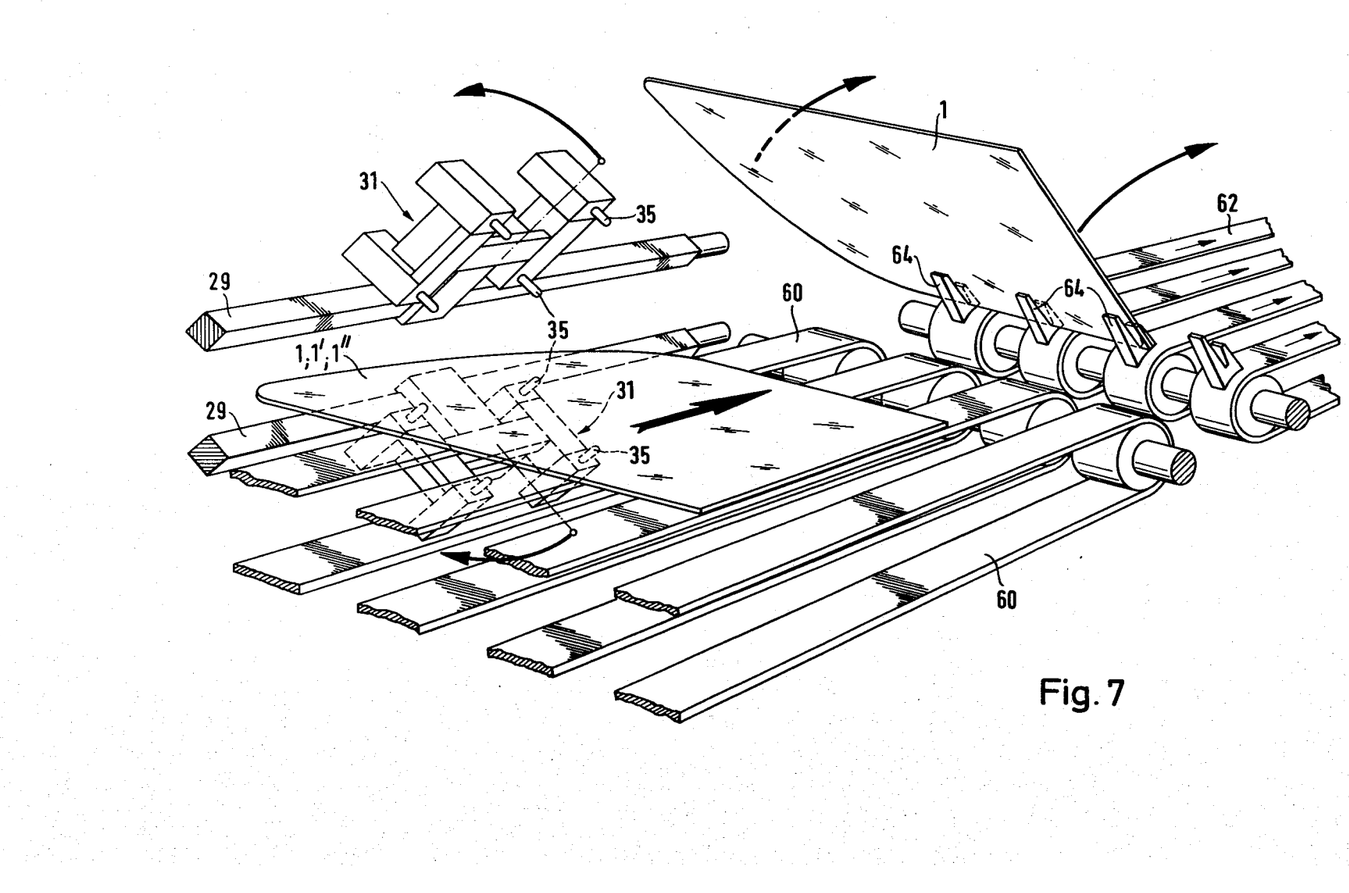
FIG. 7 is a perspective view illustrating the transfer of sheets from the conveyor of FIG. 6 onto a succeeding fan-shaped conveyor.

As shown in FIG. 7, the sheets on the conveyor belt 60 may be moved to a fan conveyor 62 where fork-shaped supports 64 engage the sheets to move the sheets to an upright position. The driving motors for the belts 60 and 62 are controlled in a conventional manner by way of switches, not shown, and are synchronized with respect to each other such that the forked-shaped supports will engage an edge of a sheet as a sheet is delivered to it by the conveyor 60. As soon as the conveyor 60 is completely unloaded, the gripping jaws 31 are returned to their starting position as a result of actuating pressure cylinder 53 where the entire device is then ready for a subsequent sheet unfastening cycle.

It is possible to adjust the arm 65 in the fixing means 66 in order to control the force with which the releasing means 57 engages the sheet.

We claim:

1. In an apparatus for automatically unfastening sheets of glass which are suspended vertically under the influence of gravity from pincer-like gripping means and where the weight of the sheet causes the gripping means to automatically grip the sheet with the apparatus including a lifting element for engaging and lifting a sheet to move the sheet to a transportation means and including a release means for releasing the pincer-like gripper means for engagement with a sheet; the improvement comprising in that said lifting means has at least one gripper element movable in a horizontal direction toward a surface of a sheet to grip the same.

2. In an apparatus according to claim 1 the improvement further comprising in that said gripper element comprises a suction plate made of an elastic material adapted to be disposed on one side of a sheet and said lifting means having in addition a supporting means adapted to be disposed on the opposite side of said sheet from said suction plate.

3. In an apparatus according to claim 1 the improvement further comprising in that lifting means has two gripper elements each comprising a jaw with the jaws of the two gripper elements being disposed opposite one another and movable with respect to each other to clamp a sheet of glass therebetween.

4. In an apparatus according to claim 3 the improvement further comprising in that each said jaw includes at least two pressure elements with the pressure elements of the jaw of one gripper element being disposed opposite the pressure elements of the jaw of the other gripper element.

5. In an apparatus according to claim 4 the improvement further comprising in that said pressure elements are in the form of pegs.

6. In an apparatus according to claim 3 the improvement further comprising in that said jaws form part of hydraulic or pneumatic pistons.

7. In an apparatus for automatically unfastening sheets of glass which are suspended vertically under the influence of gravity from pincer-like gripping means and where the weight of the sheet causes the gripping means to automatically grip the sheet with the apparatus including a lifting element for engaging and lifting a sheet to move the sheet to a transportation means and including a release means for releasing the pincer-like gripping means from engagement with a sheet; the improvement comprising in that said lifting means has two gripper elements each comprising a jaw with the jaws of the two gripper elements being disposed opposite one another and movable with respect to each other in a horizontal direction toward a surface of a sheet of glass to clamp the sheet therebetween and in that said jaws are mounted on pivotal arms.

8. In an apparatus according to claim 7 the improvement further comprising in having a rotatable shaft mounted below the level of a sheet of glass adapted to be suspended in the apparatus and wherein said arms are mounted on said shaft.

9. In an apparatus according to claim 8 the improvement further comprising in that two said shafts are mounted below said level with said shafts being rotated synchronously and in opposite directions.

10. In an apparatus according to claim 9 the improvement further comprising in having a hydraulic or pneumatic piston for synchronously rotating said shafts.

11. In an apparatus according to claim 8 the improvement further comprising in that a plurality of arms are mounted on each said shaft.

12. In an apparatus according to claim 11 the improvement further comprising in that said arms are adjustably positioned along each said shaft.

13. In an apparatus according to claim 8 the improvement further comprising in having a joint spar which is rotatable about a horizontal axis and on which the two said shafts are rotatably mounted whereby glass sheets may be tilted about said horizontal axis.

14. In an apparatus according to claim 13 the improvement further comprising in that said joint spar is movable in a vertical plane.

15. In an apparatus according to claim 14 the improvement further comprising in having a horizontal conveyor positioned at the level of said horizontal axis.

16. In an apparatus for automatically unfastening sheets of glass which are suspended vertically under the influence of gravity from pincer-like gripping means and where the weight of the sheet causes the gripping means to automatically grip the sheet with the apparatus including a lifting element for engaging and lifting a sheet to move the sheet to a transportation means and including a release means for releasing the pincer-like gripper means from engagement with a sheet; the improvement comprising in that said lifting means has at least one gripper element movable in a horizontal direction toward a surface of a sheet to grip the same and in having a rotatable release means support shaft and a coupling parallelogram frame mounted at one end to said support shaft with said release means being mounted on the opposite end of said frame than said support shaft whereby said release means may be moved to push the pincer-like gripping means out of engagement with a sheet of glass.

17. In an apparatus according to claim 16 the improvement further comprising in that the coupling parallelogram frame is adjustably mounted on the support shaft for control the force with which the releasing means engages the sheet.

18. In an apparatus for automatically unfastening sheets of glass which are suspended vertically under the influence of gravity from pincer-like gripping means and where the weight of the sheet causes the gripping means to automatically grip the sheet with the apparatus including a lifting element for engaging and lifting a sheet to move the sheet to a transportation means and including a release means for releasing the pincer-like gripping means from engagement with a sheet; the improvement comprising in that said lifting means has two gripper elements each comprising a jaw with the jaws of the two gripper elements being disposed opposite one another and movable with respect to each other in a horizontal direction toward a surface of a sheet of glass to clamp the sheet therebetween, in that each jaw includes at least two pressure elements with the pressure elements of the jaw of one gripper element being disposed opposite the pressure elements of the jaw of the other gripper element and in that at least one of the pressure elements disposed opposite each other is flexible.

* * * * *